Jan. 28, 1969     S. H. MERRY     3,423,877
QUICK ACTING HATCH COVER

Filed Nov. 16, 1966     Sheet _1_ of 2

INVENTOR
STANLEY H. MERRY
BY *Hodges*
ATTORNEY

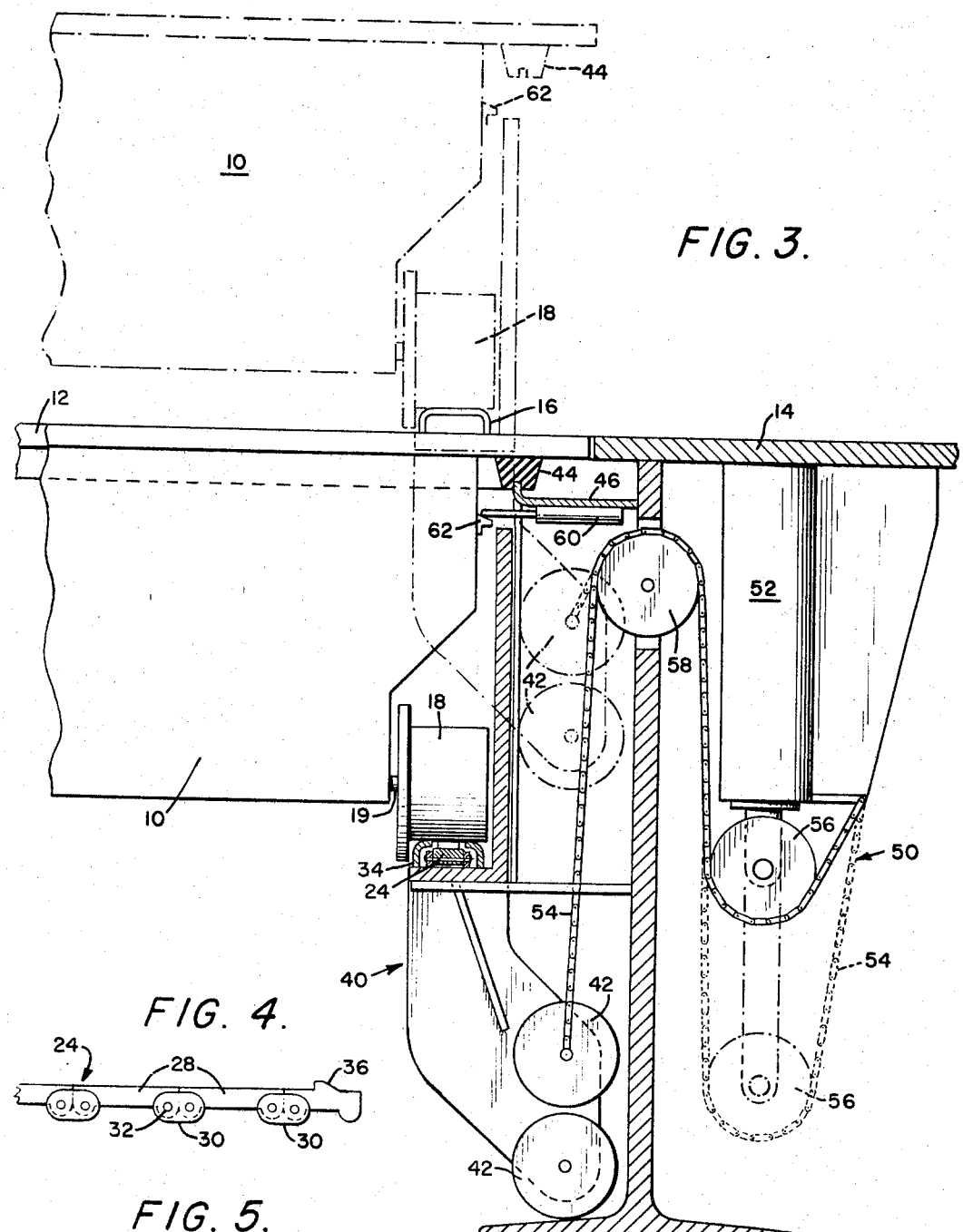

United States Patent Office 3,423,877
Patented Jan. 28, 1969

3,423,877
QUICK ACTING HATCH COVER
Stanley H. Merry, Duxbury, Mass., assignor, by mesne assignments, to the United States of America as represented by the Secretary of the Navy
Filed Nov. 16, 1966, Ser. No. 595,321
U.S. Cl. 49—211      8 Claims
Int. Cl. E05d 15/10

ABSTRACT OF THE DISCLOSURE

A quick acting mechanically operated hatch cover which when closed is flush with the deck of the ship and having a support structure to raise the hatch cover above deck level for subsequent removal by pushing the hatch cover out of alignment with the hatch by the use of unidirectional bending link chain means; thus providing a one-piece hatch cover which is mounted flush with the deck when closed, which may be quickly opened and closed mechanically with shipboard equipment, and which presents negligible stowage and safety problems when opened.

---

This invention relates generally to marine cargo hatch covers and more particularly to quick acting, mechanically operated hatch covers which when closed are flush with the deck of the ship.

The loading and unloading of cargo-handling ships is a costly and time consuming process. In the past, a significant portion of the time was involved in opening and closing the deck hatches. Hatch opening involved either the manual removal of tarpaulins and a plurality of wood planks or the hoisting of large steel hatch panels. Stowage of these hatches presented a space and safety problem. Because of their light construction, the surface of the hatch cover may not be used for carrying additional cargo. More recently mechanized hatch covers have been developed, but these are generally sectional and when removed are either rolled to a stacked arrangement or are articulated into a hinged configuration. They thus present a stowage problem immediately adjacent the hatch opening interfering with cargo handling. Their operation is only slightly less time consuming than previously. Generally, past and more recent improvements utilized a raised coaming around the hatch edge which presents the safety hazard of tripping and falling over this coaming.

The purpose of this invention is to overcome the aforesaid disadvantages of the prior art devices and provides a one piece hatch cover which is mounted flush with the deck when closed, which may be quickly opened and closed mechanically, and which present less stowage or safety problems when open.

Accordingly, an object of the present invention is to provide a quick acting hatch cover.

Another object is to provide a quick acting hatch cover that is mechanically operated.

A further object is to provide a quick acting hatch cover that is operated by ship-board machinery.

A still further object is to provide a quick acting hatch cover which will lay flush with the deck when closed and which will present less obstruction adjacent the hatch opening when open.

Yet another object is to provide a quick acting hatch cover the machinery for mechanical operation of which is below the deck surface so as to provide no encumbrance to personnel traffic.

A still further object is to provide a quick acting hatch cover which is strong enough to carry cargo when in a closed position.

Other objects and many of the attendant advantages of this invention will be readily appreciated as the same becomes better understood by reference to the following description when considered in connection with the accompanying drawings in which:

FIG. 3 is a section of the supporting structure and raising mechanism taken on line 3—3 of FIG. 1;

FIG. 4 is a side view of the link chain used for moving the hatch cover; and

FIG. 5 is a top view of the chain of FIG. 4.

Figure 1:
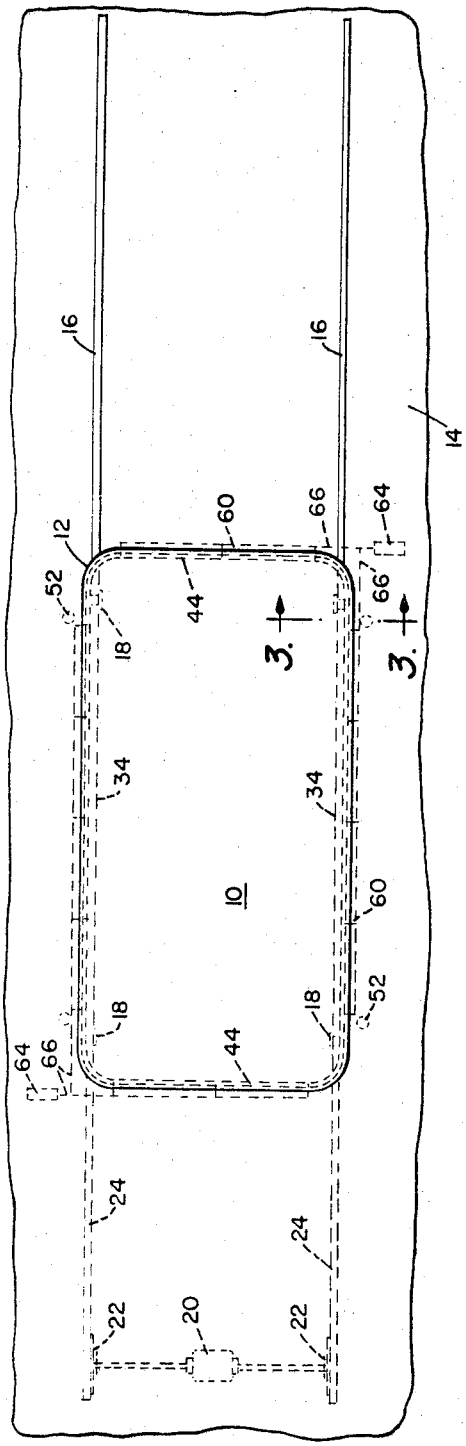
FIG. 1 shows a plan view of the hatch in the closed position in the deck opening.

Referring now to the drawings, wherein like reference numerals designate corresponding parts throughout the several views, there is shown in FIG. 1, a hatch cover 10 in place over a hatchway 12 formed in deck 14. Upon the upper surface of the deck are attached parallel rails 16 approximately the same length as the hatch cover 10 for providing guiding support for the antifriction devices or wheels 18 when the hatch cover is removed.

In order to provide motivating force to remove and replace the hatch cover there is provided a reversible motor 20 suitably geared to rotate the drive sprockets 22 which in turn push or pull the link chains 24 depending on the direction of rotation of the motor. The motor and associated drive mechanism, including the link chains and the chain retrieval channels 26 may be located subjacent the deck 14 and adjacent the hatchway 12 to provide an unobstructed deck surface in the vicinity of the hatchway best shown in FIG. 2.

Figure 2:
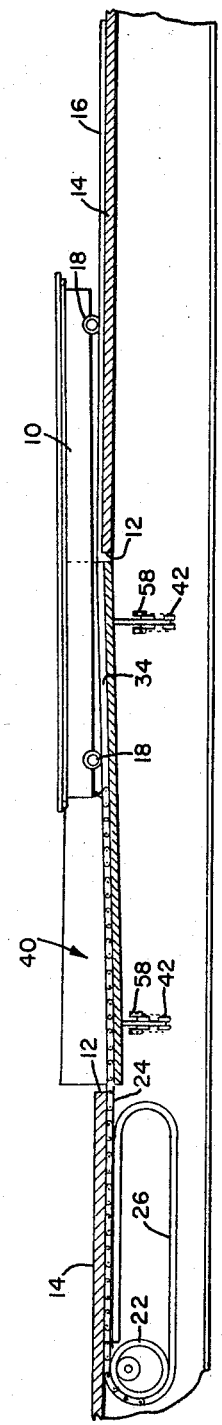
FIG. 2 shows a side view, partly in section when the tracks of the supporting structure have been raised to assume a flush position with the deck and showing the hatch cover partly removed from the hatchway.

An important feature of this invention is the use of a roller link chain which is capable of not only the pulling feature of normal chains but also capable of pushing. This feature is accomplished and best shown in FIGS. 4 and 5 by the use of a roller link chain wherein the main links 28 are provided with substantially flat ends which abut one another when the chain is straight. A connecting link 30 consists of a pair of plates on either side of and attached at each end to the ends of adjacent main links with suitable shouldered rivets 32 permitting rotation about the rivet joints. It can thus be seen from FIG. 4 and FIG. 5 that the chain may push and pull a load, and further that it will bend in only one direction and may readily be stowed in the chain retrieval channels 26 as shown in FIG. 2.

FIG. 3 shows one of the link chains 24 resting in one of the generally U-shape parallel tracks 34 which not only carry the antifriction devices or wheels 18, but guide the link chain thereby further inhibiting bending when the hatch cover is being pushed by the chain. The chains are provided with releasable connecting members such as latches 36 or the like at their outer ends to removably attach, for pulling or pushing, to the hatch cover.

Referring to FIG. 3, there is shown in cross-section, details of the supporting structure or frame 30 by which the hatch cover 10 may be raised and lowered, the hydraulic mechanism 50 for controlling the frame, and one of the hydraulically actuated dogs 60 for securing the hatch cover flush with the deck. The hatch cover shown generally as 10, comprises a flat deck plate and suitable strengthening members; affixed to these strengthening members are a plurality of axles 19 upon which are mounted, for rotary motion, flanged wheels 18. These wheels rest on the U-shaped tracks 34 (previously described in detail) carried by the frame or supporting structures 40. This frame is provided with guide wheels 42, and may be raised or lowered by actuation of the hydraulic mechanism 50 comprising a plurality of hydraulic rams 52 and suitable roller link chains 54 and sprockets 56, 58, the operation of which is obvious when viewing FIG. 3. It is readily seen that when the frame is raised the U-shaped tracks 34 become aligned with the deck rails 16 and the hatch cover may be easily moved on or off the hatch opening. In the lowered position the tracks 34 drop slightly away from the wheels allowing the hatch cover to be dogged down by hydraulic dogs 60, operated by master cylinder 64 through tubes 66, contacting the cammed surfaces 62 thence compressing gasket 44 onto gutter 46 for watertight integrity.

In operation, to open the hatchcover, the hydraulic dogs 60 are actuated by master cylinder 64, through tubes 66, to disengage the cam surfaces 62 on the cover 10. The hydraulic rams 52 are actuated to move the sprockets 56 in a downward direction, pulling chains 54 over the fixed idler sprockets 58, affixed to the deck structure thus raising the frame 40 to a position where the tracks 34 are in flush alignment with the fixed deck rails 16. The motor 20 is actuated to push the chains 24 from the stowage channels 26 into latched engagement with the hatch cover 10. Motor action is continued to push the chains along the inside of the tracks 34 which thence push the hatch cover 10 carried by wheels 18 to an open position. When the cover is completely off the hatchway the chains are released from the cover and retrieved into their stowage channels by motor reversal. The hydraulic rams 52 are then drawn up thus lowering the now empty frame to a position below deck level, where cargo handling may commence unimpeded.

To close the hatch, the frame is raised by extending the hydraulic rams, the chain motor actuated to push the chains along the guide tracks on the frame to a final latching engagement with the hatch cover, at which point the chain motor is reversed thus pulling the hatch cover back into a position directly over the opening. The chains are disengaged and continue to be pulled back into their respective stowage channels. Suitable limit switches (not shown) are activated to stop the motion of the chains in the proper place and to prevent overrun which might damage the mechanism. The frame now carrying the hatch cover is lowered by reversal of the hydraulic rams. The hatch is then dogged down by reverse operation of the hydraulic dogs 60, to pull the hatch cover flush with the deck and the gasket 44 in compression against the gutter 46.

From the above description and operation it can be seen that there has been provided a quick acting hatch cover which is flush with the deck when closed providing cargo loading area, and can be easily opened with shipboard machinery and stowed alongside the opening but causing no obstruction or safety hazard to cargo handling or passing personnel traffic.

It will be obvious to those skilled in the art that various changes may be made without departing from the spirit and scope of the invention and the invention is not limited to what is shown in the drawings and described in the specification, but only as indicated in the appended claims.

What is claimed is:

1. A quick acting hatch cover arrangement for opening and closing a deck hatchway comprising in combination:
   a hatch cover;
   a supporting structure vertically movable within the hatchway for raising and lowering the hatch cover;
   a pair of parallel tracks attached to the top of the supporting structure for carrying and guiding the hatch cover for movement on and off the hatch opening to the deck;
   link chain means attached subjacent the deck adjacent one edge of the hatchway and releasably connected to the hatch cover for providing force for movement of the hatch cover;
   hydraulic means for raising and lowering the supporting structure, said hydraulic means further comprising:
      a plurality of hydraulic rams;
      a plurality of sprockets two each rotatably attached to each of the plurality of hydraulic rams;
      a plurality of fixed sprockets each attached for rotation to the deck structure;
      a plurality of roller link chains each attached at one end to the supporting structure and each of the other ends attached to the deck structure and running over the movable and fixed sprockets whereby upon extension of the hydraulic rams the supporting structure is raised; and
   hydraulic dog means for securing the hatch cover in a closed position.

2. The device of claim 1, further comprising:
   a plurality of anti-friction devices attached to the hatch cover and in movable contact with the parallel tracks.

3. The device of claim 2, wherein the antifriction devices are:
   a plurality of flanged wheels mounted for rotation on the hatch cover for rolling guided contact on the parallel tracks of the supporting structure.

4. The device of claim 3 wherein the parallel tracks on the supporting structure are U-shaped channels having the legs extending upward.

5. The device of claim 1 wherein the link-chain means comprises:
   a reversible drive motor; and
   a link chain capable of providing force in both a pushing and pulling mode.

6. The device of claim 5 wherein the link chain is further characterized by having the ability to bend in only one direction from a straight orientation.

7. The device of claim 6 wherein the link chain rests in the U-shaped parallel tracks for longitudinal sliding movement.

8. The device of claim 1 further comprising:
   a pair of parallel rails attached to the deck in alignment and abutting the parallel tracks on the supporting structure when in the raised position.

References Cited

UNITED STATES PATENTS

| | | | |
|---|---|---|---|
| 2,269,631 | 1/1942 | Marinello | 49—212 X |
| 2,445,131 | 7/1948 | Wartian | 49—212 X |
| 2,599,747 | 6/1952 | Craigon | 49—361 |
| 2,815,203 | 12/1957 | Coors | 49—212 |

FOREIGN PATENTS

| | | |
|---|---|---|
| 1,408,464 | 7/1965 | France. |

DAVID J. WILLIAMOWSKY, *Primary Examiner.*

J. KARL BELL, *Assistant Examiner.*

U.S. Cl. X.R.

49—361